US012634565B2

(12) United States Patent
Yin et al.

(10) Patent No.: US 12,634,565 B2
(45) Date of Patent: May 19, 2026

(54) LIGHT-EFFICIENT MULTISPECTRAL FLUORESCENCE IMAGING

(71) Applicant: Alcon Inc., Fribourg (CH)

(72) Inventors: Lu Yin, Keller, TX (US); Vignesh Suresh, Woodland Hills, CA (US); Ramesh Sarangapani, Coppell, TX (US)

(73) Assignee: Alcon Inc., Fribourg (CH)

( * ) Notice: Subject to any disclaimer, the term of this patent is extended or adjusted under 35 U.S.C. 154(b) by 81 days.

(21) Appl. No.: 18/475,390

(22) Filed: Sep. 27, 2023

(65) Prior Publication Data

US 2024/0107135 A1      Mar. 28, 2024

Related U.S. Application Data

(60) Provisional application No. 63/377,299, filed on Sep. 27, 2022.

(51) Int. Cl.
| | |
|---|---|
| *H04N 23/16* | (2023.01) |
| *H04N 5/265* | (2006.01) |
| *H04N 23/56* | (2023.01) |
| *H04N 23/90* | (2023.01) |

(52) U.S. Cl.
CPC ............. *H04N 23/16* (2023.01); *H04N 5/265* (2013.01); *H04N 23/56* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 7,246,905 B2 | 7/2007 | Benedikt | |
| 9,185,357 B2 | 11/2015 | Boccara | |
| 2006/0140497 A1* | 6/2006 | Kondo | G06T 7/74 |
| | | | 382/254 |
| 2010/0085537 A1* | 4/2010 | Ramella-Roman | |
| | | | A61B 5/14555 |
| | | | 359/619 |

(Continued)

FOREIGN PATENT DOCUMENTS

| | | |
|---|---|---|
| CN | 112816420 A | 5/2021 |
| WO | 9916353 A1 | 4/1999 |

(Continued)

OTHER PUBLICATIONS

Ayon Dey, Machine learning algorithms: a review, International jurnal of computer science and information technologies, vol. 7, pp. 1174-1179, 2016.

(Continued)

*Primary Examiner* — Eileen M Adams

(57) ABSTRACT

In certain embodiments, a system, a computer-implemented method, and computer-readable medium are disclosed for light efficient fluorescence imaging. The retina is flashed with broadband light and returned light is imaged after passing through one or more filers, such as notch filers, low-pass filters, and high-pass filters. Images may be captured with a single camera or at least two cameras, one capturing transmitted light from the filter and the other capturing returned light. Images may be combined by subtraction and/or addition to obtain a combined image representing light within a passband whereas no passband filters are used during imaging.

21 Claims, 7 Drawing Sheets

(56)                    References Cited

U.S. PATENT DOCUMENTS

| | | | |
|---|---|---|---|
| 2012/0065518 A1 | 3/2012 | Mangoubi | |
| 2013/0128227 A1 | 5/2013 | Cui et al. | |
| 2014/0002793 A1 | 1/2014 | Hogan | |
| 2014/0276025 A1 | 9/2014 | Durbin | |
| 2014/0300864 A1 | 10/2014 | Fukuma | |
| 2017/0042464 A1 | 2/2017 | Verdooner | |
| 2017/0297144 A1* | 10/2017 | Nakanishi | H04N 23/56 |
| 2019/0343384 A1 | 11/2019 | Plaian | |
| 2022/0151568 A1 | 5/2022 | Yao | |
| 2022/0157470 A1 | 5/2022 | Sylvestre | |
| 2022/0260413 A1* | 8/2022 | Perruchot | G01J 1/42 |

FOREIGN PATENT DOCUMENTS

| | | | |
|---|---|---|---|
| WO | 2015023990 A1 | 2/2015 | |
| WO | 2020047594 A1 | 3/2020 | |
| WO | 2021151046 A1 | 7/2021 | |
| WO | 2022011420 A1 | 1/2022 | |
| WO | 2022153320 A1 | 7/2022 | |

OTHER PUBLICATIONS

Chen Qingyu et al., Multi-modal, multi-task, multi-attention (M3) deep learning detection of regular pseudodrusen: towards automated accessible classification of age-related macular degeneration, pp. 1-31, 2020 URL:https://arxiv.org/abs/2011.05142vl.

Citation: M. Arsalan et al., Segmenting Retinal Vessels Using a Shallow Segmentation Network to Aid Ophthalmic Analysis, Mathematics, vol. 10, p. 1536, 2022.

J. Fhima et al., PVBM: A Python Vasculature Biomarker Toolbox Based on Retinal Blood Vessel Segmentation, Cornell University, 2022.

Sarraf David et al.,Retinal pigment epithelial tears in the era of intravitreal pharmacotherapy: risk factors, pathogenesis, prognosis and treatment (an American Ophthalmological Society thesis), American Ophthalmological Society, Transactions, vol. 112, pp. 142-159, 2014.

Yonlong He, et al., Segmenting Diabetic Retinopathy Lesions in Multispecial Images Using Low-Dimensional Spatial-Spectral Matrix Representation, Ieee Juournal of Biomedical and helth informatics, Ieee, Piscataway, NJ, USA, vol. 24, No. 2, pp. 493-502, Apr. 20, 2019.

Yoon Jonghee, @Hyperspectrial Imaging for Clinical Applications@ Biochip Journal, Korean Biochip, Seoul, South Korea, vol. 16, No. 1, Jan. 4, 2022, pp. 1-12.

* cited by examiner

LIGHT-EFFICIENT MULTISPECTRAL FLUORESCENCE IMAGING

BACKGROUND

The diagnosis and treatment of many eye disorders requires imaging of a patient's eye. The retina has many intricate features that are imaged to diagnose eye disorders as well as other disorders that cause physiological changes to the retina. Some features correspond to healthy eye anatomy or pathologies exhibit fluorescence when illuminated. The spectral "fingerprint" of this fluorescence may be used as a biomarker corresponding to a specific pathology. For example, a fundus autofluorescence imaging (FAF) is commonly used to diagnose retinal degenerative diseases.

In prior approaches to measuring fluorescence, a complex and expensive spectrometer is used to detect the spectra of reflected light but has limited ability to detect spatial information for the retina. As such, the diagnosis of some diseases requires an expensive test performed by relatively few institutions that have the required expertise and equipment.

It would be an advancement in the art to improve accessibility to fluorescence imaging and to combine fluorescence information with spatial information regarding a patient's retina.

SUMMARY

In certain embodiments, a system is provided that includes one or more processing devices and one or more memory devices coupled to the one or more processing devices. The one or more memory devices store executable code that, when executed by the one or more processing devices, causes the one or more processing devices to receive a first image of first light reflected from a retina of a patient and filtered according to a first filtering. A second image is received, the second image being of second light reflected from the retina of the patient and filtered according to a second filtering. The first and second images are combined to obtain a combined image representing a portion of at least one of the first light and the second light within a passband, neither the first filtering nor the second filtering including passband filtering. The combined image may be output to a display device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Fundus autofluorescence imaging (FAF) has been an import tool for diagnosing retinal degenerative diseases. FAF includes illuminating the retina with light and detecting resulting auto-fluorescence. The excited auto-fluorescence may come from multiple sources (e.g., disease biomarkers). For early disease detection and better diagnosis, it is best to resolve the spectra of the fluorescence to establish spectral "fingerprints" of different biomarkers to establish which disease marker is the major contributor to the fluorescence.

In prior approaches, fluorescence imaging uses single-wavelength (narrow-band) light to excite the tissue of the retina and broad-band detection of fluorescence emission. In prior approaches, the spectrum of fluorescence signal is measured using a spectrometer at the detector. However, it is often difficult to resolve the spectrum and capture spatial information of the fundus at the same time. The systems and methods disclosed herein enable imaging of fluorescence of the eye with high-spatial accuracy using relatively simple equipment that does not include a spectrometer.

Multispectral imaging (MSI) is another prior approach for imaging the retina within multiple wavelength bands. Typical MSI techniques illuminate the eye with narrow-band light at a plurality of different bands. The light is detected by a detector after passing through a transmission filter that matches the narrow-band light. However, for fluorescence imaging, such a technique cannot be applied directly. Fluorescence imaging is performed by flashing a high intensity exciting light. Collecting only a narrow band of fluorescence signal passing through a transmission filter as is used for MSI is not light-efficient. Capturing fluorescence for a plurality of wavelength bands in this manner would require multiple flashes and could result in phototoxicity. The systems and methods disclosed herein enable imaging of fluorescence with high light-efficiency and without causing phototoxicity.

Figure 1:
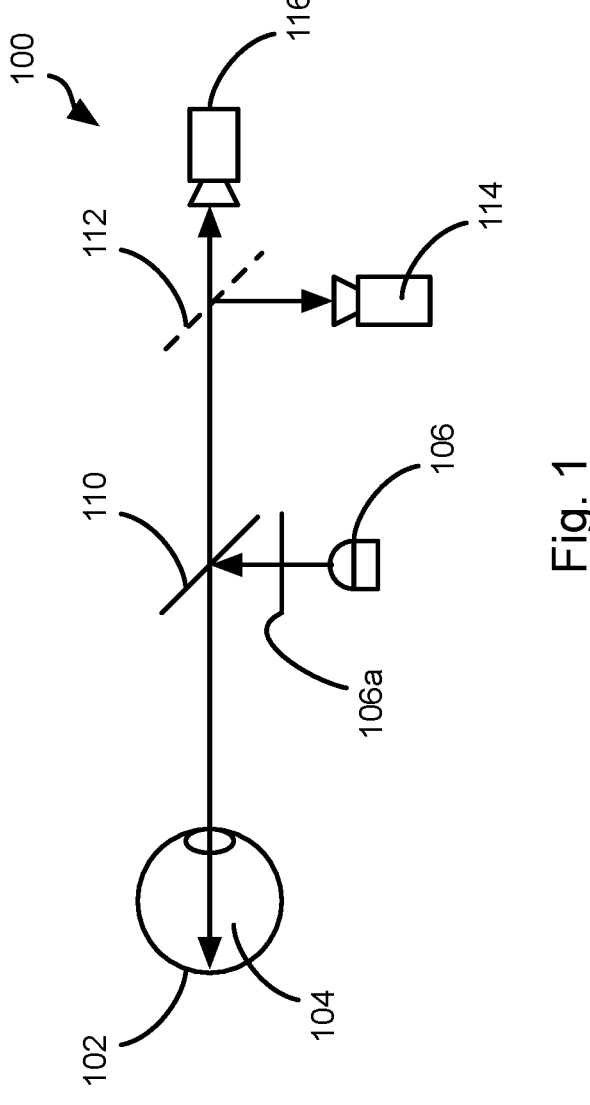
FIG. 1 illustrates an example system for performing light-efficient fluorescence imaging in accordance with certain embodiments.

FIG. 1 illustrates an example system 100 for performing light-efficient fluorescent imaging of the retina 102 of an eye 104 of a patient without the use of a spectrometer. The system 100 includes a light source 106. The light source 106 may be embodied as one or more light-emitting diodes (LED) or other types of light sources. The light source 106 may be a narrowband (e.g., a −3 dB bandwidth of less than 100, 50, 25, or 10 nm) or single wavelength, or a combination thereof. The light from the light source may be in the visible spectrum (e.g., between 380 and 700 nm) or may be in the infrared spectrum. A filter 106a may filter light from the light source 106 in order to reduce light that does not contribute to exciting fluorescent emission.

Light from the light source 106 may be transmitted into the eye 104 by way of a beam splitter 110, which may be embodied as a dichroic mirror. The beam splitter 110 may operate as a filter with respect to light returned from the eye 104 and may attenuate (e.g., by at least 10 dB) light in the passband of the filter 106a while not substantially attenuating (e.g., less than 3 dB) light in one or more other wavelength bands corresponding to fluorescence of the retina 102. Part of the light returned from the retina 102 passes through the beam splitter 110. As used herein "the returned light" refers to light that has been filtered by the beam splitter 110 (by transmission in the illustrated example) and/or one or more other filtering steps and will constitute primarily light emitted as fluorescence by the retina 102, e.g., light other than fluorescence being attenuated at least 6 dB more than the fluorescence in the returned light.

The returned light is incident on an optical filter 112. A portion of the returned light is rejected by the optical filter 112 and is incident on a camera 114. A portion of the returned light is transmitted through the optical filter 112 and is incident on a camera 116. The cameras 114, 116 may be color (red, green, blue) cameras, monochrome cameras, infrared cameras, or other types of cameras. Other optical elements such as lenses, pinhole filters, mirrors, or the like may be present in the system 100 to focus light on the retina 102, suppress reflections from structures other than the retina 102 (e.g., the cornea), and focus light on the detectors of the cameras 114, 116.

The optical filter 112 may be embodied as a dichroic mirror or other type of optical filter. The optical filter 112 may be a low-pass filter, high-pass filter, notch filter, or other type of filter. As is apparent in FIG. 1, an optical axis of the optical filter 112 may be at a non-parallel angle relative to the optical axes of the cameras 114, 116, such as at an angle between 42 and 48 degrees, between 44 and 46 degrees, or 45 degrees. The system 100 may include multiple optical filters 112 that may be selectively placed in the illustrated location or elsewhere in order to perform fluorescence imaging as described in greater detail below.

FIGS. 2A to 2D illustrate the operation of the system 100. FIGS. 2A to 2D are explained with reference to a spectrum R of light returned from a point on the retina 102, such as a spectrum of fluorescence returned from a point on the retina 102. The spectrum would be approximated by the cameras 114, 116 as a single monochrome pixel or red, green, and blue intensities (see, FIG. 5 and corresponding discussion) according to the sensitivity spectrums of the cameras 114, 116.

Figure 2A:
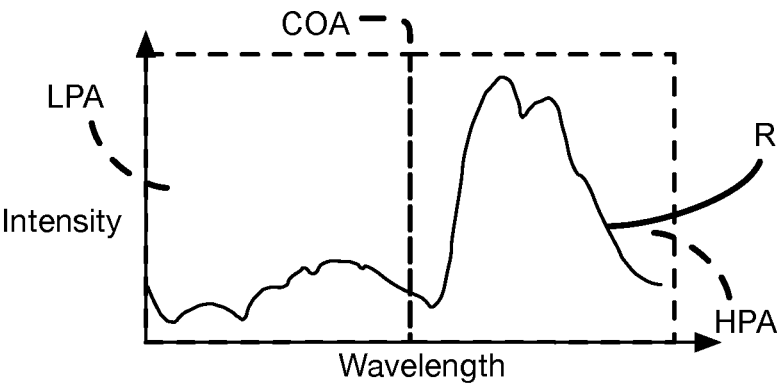
FIGS. 2A to 2C are plots of a spectrum of returned light combined with the wavelength response of optical filters for the system of FIG. 1 in accordance with certain embodiments.

Referring specifically to FIG. 2A, where the optical filter 112 is a high pass filter or a low pass filter, one of the cameras 114, 116 ("the first camera") will capture light predominantly within a low-pass wavelength band LPA with light at wavelengths above the low-pass wavelength band LPA being attenuated by the optical filter 112. The other camera 116, 114 ("the second camera") will capture light predominantly within a high-pass wavelength band HPA with light at wavelengths below the high-pass wavelength band HPA being attenuated by the optical filter 112. The optical filter 112 may define a cutoff wavelength COA (e.g., −3 dB cutoff wavelength) defining the boundary between the wavelength bands LPA, HPA.

Figure 2B:
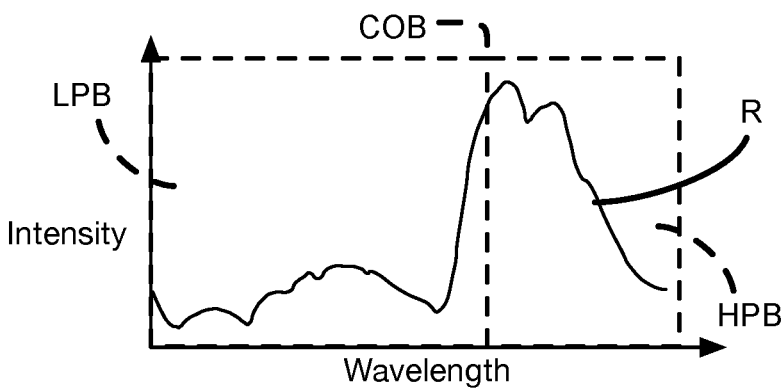
Figure 2C:
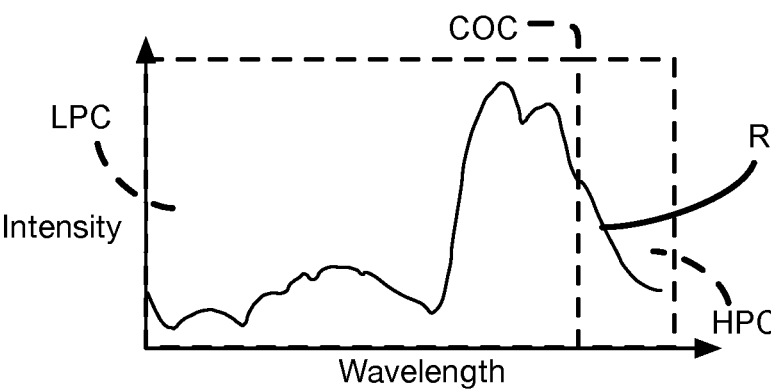

Referring to FIGS. 2B and 2C, other optical filters 112 may be used, each having different cutoff wavelengths COB, COC between the corresponding low-pass bands LPB, LPC and different high-pass bands HPB, HPC relative to each other. For example, the cutoff wavelengths may be such that COA <COB<COC.

Although wavelength response of three different filters 112 are shown, more or fewer filters 112 may be used. The retina 102 may be flashed with the light source 106 for each filter 112 using the system 100 in order to capture an image with the cameras 114, 116 for each filter 112. Accordingly, the intensity of the light source 106 and the number of filters 112 may be chosen to avoid phototoxicity.

Figure 2D:
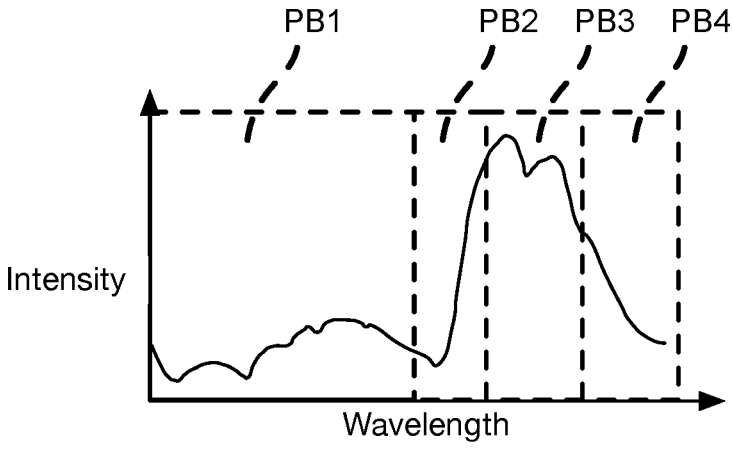
FIG. 2D illustrates equivalent passbands obtained using the system of FIG. 1 in accordance with certain embodiments.

Referring to FIG. 2D, images captured using the cameras 114, 116 for each filter 112 may be combined to achieve estimated images representing light within equivalent passbands PB1-PB4 that are more in number than the number of filters 112. Note further that when capturing images using the filters 112, the range of wavelengths collected by each camera 114, 116 is wider than the equivalent passbands PB1-PB4, which is more light-efficient. That is to say, that the amount of returned light collected relative to the amount of light irradiating the retina 102 is greater than for a passband filter with an equivalent passband PB1-PB4. Accordingly, the degree of phototoxicity relative to the amount of spectral information obtained is lower than if passband filters were used.

The images obtained using the filters 112 and cameras 114, 116 may be combined in various ways. In the following explanation, the following symbols are used:

ILA represents the image obtained with the first camera for the low-pass wavelength band LPA (e.g., captured with the camera 114 where the filter 112 is a high-pass filter or captured with the camera 116 where the filter 112 is a low-pass filter).

IHA represents the image obtained with the first camera for the low-pass wavelength band HPA (e.g., captured with the camera 114 where the filter 112 is a low-pass filter or captured with the camera 116 where the filter 112 is a high-pass filter).

ILB represents the image obtained with the first camera for the low-pass wavelength band LPB.

IHB represents the image obtained with the first camera for the low-pass wavelength band HPB.

ILC represents the image obtained with the first camera for the low-pass wavelength band LPC.

IHC represents the image obtained with the first camera for the low-pass wavelength band HPC.

IP1, IP2, IP3, IP4 represent the images estimating light in equivalent passbands PB1, PB2, PB3, PB4, respectively.

In a first approach, a first image for a low-pass wavelength band with a first cutoff wavelength is subtracted from an image for a low-pass wavelength band with a second cutoff wavelength that is higher than the first cutoff wavelength to obtain a passband image corresponding to the wavelength band between the first and second cutoff wavelengths. For example, IP1, IP2, IP3, IP4 may be obtained as follows:

IP1 may be equivalent to ILA $$IP2=ILB-ILA$$

$$IP3=ILC-ILB$$

IP4 may be equivalent to IHC

In a second approach, a first image for a high-pass wavelength band with a first cutoff wavelength is subtracted from an image for a high-pass wavelength band with a second cutoff wavelength that is lower than the first cutoff wavelength to obtain a passband image corresponding to the wavelength band between the first and second cutoff wavelengths. For example, IP1, IP2, IP3, IP4 may be obtained as follows:

IP1 may be equivalent to ILA $$IP2=IHA-IHB$$

$$IP3=IHB-IHC$$

IP4 may be equivalent to IHC

A third approach is a combination of the first and second approaches. An image corresponding to a wavelength passband according to the first approach and an image according to the second approach for the same wavelength passband may be added together (or weighted and added) and the resulting image may be scaled, such as divided by two or some other scaling factor. For example, IP1, IP2, IP3, IP4 may be obtained as follows:

IP1 may be equivalent to ILA $$IP2=(IHA-IHB+ILB-ILA)/2$$

$$IP3=(IHB-IHC+ILC-ILB)/2$$

IP4 may be equivalent to IHC

The third approach has the advantage of using information from four different images, thereby obtaining greater accuracy and permitting lower flashing light intensity. The third approach provides further advantage relative to using equivalent passband filters in addition to the benefit of a reduced number of flashes. A passband filter does not have a perfectly flat frequency response meaning that even within the nominal passband, light at wavelengths at the edges of the passband will be more attenuated relative to light at the center of the passband. Using the third approach, light at wavelengths that is well offset from the cutoff wavelengths of COA, COB, COC and is at the boundary of the equivalent passbands is used and is relatively less attenuated than for the equivalent passband filter.

As used herein, addition and subtraction of images may be understood as pixel-wise addition and subtraction such that for an image A and an image B, a value of a pixel D(x,y) in a difference (or sum) image D is equal to the difference (or sum) of pixel value A(x,y) in the image A and a pixel value B(x,y), where x and y are indexes in of values in the two-dimensional arrays of pixels composing the images A, B, and D.

Although the examples described herein reference addition and subtraction, other pixel-wise operations may be performed in a like manner, e.g. D(x,y)=A(x,y)/B(x,y), D(x,y)=A(x,y)*B(x,y), or D(x,y)=F(A(x,y), B(x,y)), where F( ) is a mathematical function selected to enhance visibility of retinal features.

In some embodiments, images may be weighted prior to combining. Such weighting may compensate for different sensitivities of the cameras 114, 116 or to otherwise improve the ability of the combined images to approximate the result that would be obtained using a spectrometer. For example, an image may be obtained for a retina 102 using the system 100 and processed to obtain combined images IP1, IP2, IP3, IP4. For the same retina 102, a spectrum of the returned light may be obtained for a point on the retina 102, such as using a spectrometer. The intensity of returned light within each equivalent passband PB1, PB2, PB3, PB4 may be integrated and compared to the pixel intensity for a pixel representing the point or block of pixels representing an area including the point in the images IP1, IP2, IP3, IP4.

The weights for the images may be selected such that following weighting, the relative intensity of the pixel or block of pixels in the images IP1, IP2, IP3, IP4 correspond to the relative magnitude of the integrals of reflectivity within each equivalent passband PB1, PB2, PB3, PB4. A plurality of points within the image may be processed in a like manner. Points from one or more other images may be processed in a like manner to obtain weights. Final weights may be obtained as an average or other combination of weights obtained for the plurality of points in a single image or a plurality of images.

Figure 3:
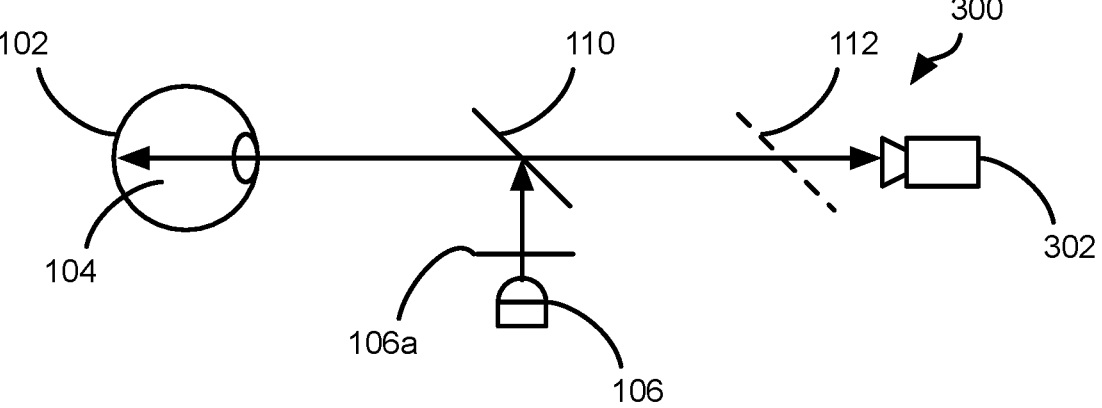
FIG. 3 illustrates an alternative system for performing light-efficient fluorescence imaging in accordance with certain embodiments.

Referring to FIG. 3 in some embodiments similar accuracy may be obtained using the system 300. The system 300 reduces complexity by using a single camera 302. The system 300 requires subjecting the retina 102 to more flashes than the system 100 while still providing improvement relative to obtaining images using conventional MSI without use of a spectrometer.

The system 300 may use a light source 106 (and possibly a corresponding filter 106a as described above) and beam splitter 110 to illuminate the retina 102. Light returned from the retina 102 passes through the beam splitter 110 (which may be a dichroic mirror filtering out the passband of the filter 106a as described above) which yields light comprising primarily fluorescence (i.e., "the returned light" as defined above). A single camera 302 detects a portion of the returned light that is either transmitted through or rejected by an optical filter 112. The system 300 may capture images for the wavelength bands (LPA, LPB, LPC, HPA, HPB, HPB) by selecting the optical filter 112 and the orientation of the optical filter 112. For example, a low-pass optical filter 112 with cutoff wavelength COA may be placed with the camera 302 receiving transmitted light to obtain an image ILA. A high-pass optical filter 112 with cutoff wavelength COA may be placed with the camera 302 receiving transmitted light to obtain an image IHA. Alternatively, the camera 302 may be moved to receive reflected light to obtain image IHA using the same optical filter 112 used to obtain ILA. Filters with cutoff wavelengths COB and COC may be used to obtain images ILB, IHB, ILC, IHC in a like manner. The images ILA, IHA, ILB, IHB, ILC, IHC obtained using the system 300 may be processed in the same manner as the images obtained using the system 100 to obtain images corresponding to equivalent passbands PB1, PB2, PB3, PB4.

Figure 4A:
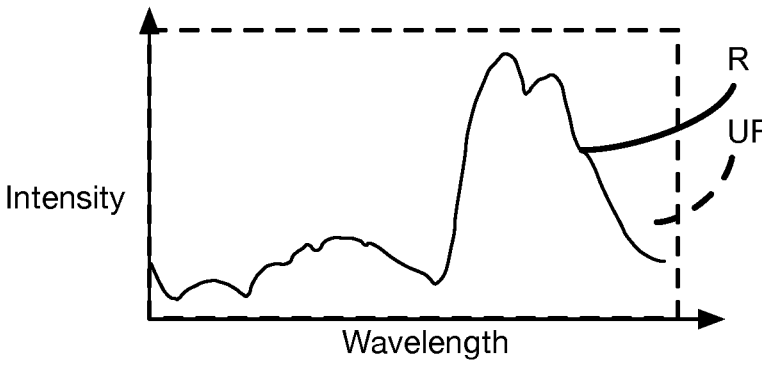
FIGS. 4A and 4B are plots of a spectrum of returned light combined with the wavelength response of a notch filter for the system of FIG. 3 in accordance with certain embodiments.
Figure 4B:
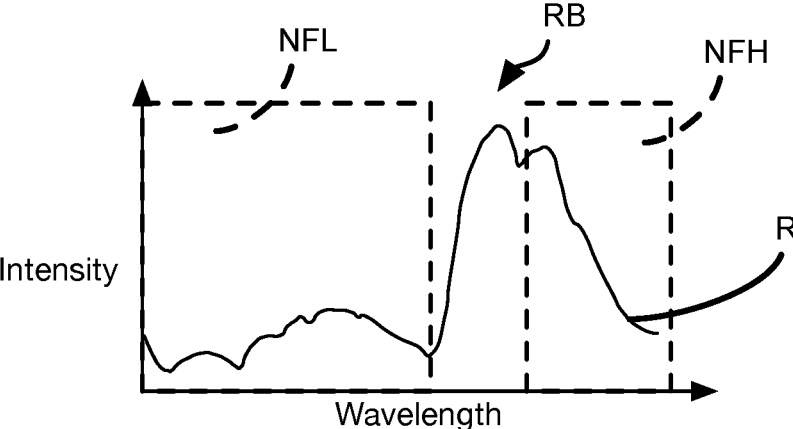

FIGS. 4A and 4B illustrate how an optical filter 112 embodied as a notch filter may be used to obtain an image for a given passband. Referring specifically to FIG. 4A, a first image of the retina 102 may be obtained using the system 100 or 300 by capturing the returned light in an unfiltered wavelength band UF. The first image may be obtained either (a) without an optical filter 112 or (b) with an optical filter 112 that has substantially no attenuation (e.g., less than 1 dB) for a range of wavelengths including the entire rejection band of the notch filter.

Referring specifically to FIG. 4B, a second image of the retina 102 may be obtained using the system 100 or 300 by capturing portions of the returned light in wavelength bands NFL and NFH and substantially excluding (e.g., at least −3 dB attenuation and/or an average attenuation of at least −6 dB) light with wavelengths within a rejection band RB between the passbands NFL and NFH.

An image representing the returned light within the rejection band may be obtained by subtracting the second image from the first image. The first and second images may be weighted before subtracting with the weights determined as described above with respect to FIG. 2D.

Figure 5:
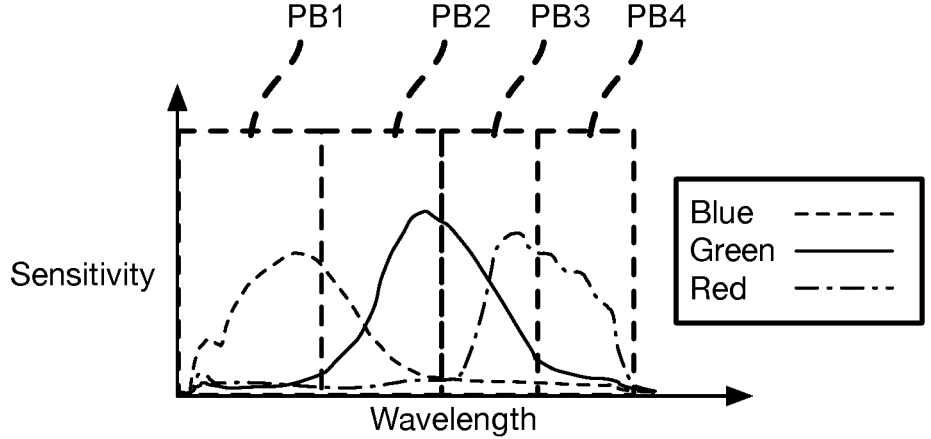
FIG. 5 illustrates equivalent passbands for the systems of FIGS. 1 and 3 with respect to the sensitivity spectra of sensors in a color camera in accordance with certain embodiments.

Referring to FIG. 5, where the cameras 114, 116 or the camera 302 are color cameras, the red, green, and blue sensors have different sensitivity spectrums. For example, any of the cameras 114, 116, 302 may be implemented as the NGENUITY 3D VISUALIZATION SYSTEM provided by Alcon Inc. of Fort Worth, Texas, USA. The pixel values of an image for a given color may be considered a separate image that may be processed as described above. The equivalent passbands PB1, PB2, PB3, PB4 may be selected with reference to the sensitivity spectra such that one or more of the sensitivity spectra (e.g., the −3 dB bandwidth) for each sensor is divided into two or more passbands. Images for the equivalent passbands may be obtained as described above for the red, green, and blue images constituting color images obtained using the system 100 or 300. In this manner, assuming four equivalent passbands, up to twelve images may be obtained for a single color image, each representing light from a different portion of the electromagnetic spectrum. In practice, the image for a given color will include no significant information for passbands far from the peak sensitivity for that color and therefore fewer images will be obtained and used.

For example, in the example of FIG. 5, a blue image may be used to obtain images corresponding to passbands PB 1 and PB2, the green image may be divided into images corresponding to PB2 and PB3, the red image may be divided into images corresponding to PB3 and PB4. Note that even though the blue image and green image, for example, are both used to generate images corresponding to PB2, the images may have different information regarding fluorescence since the sensitivity spectra of the blue and green sensors are not identical.

For a given equivalent passband, PB1, PB2, PB3, PB4, the combined sensitivity spectrum of a sensor in the frequency domain is the product of the frequency response of the equivalent passband and the sensitivity of the sensor in the frequency domain. The frequency response of the equivalent passband may be determined from the frequency response of the optical filters 112 used to achieve the equivalent passbands.

The combined sensitivities for each color and each passband may be used to obtain more detailed spectral information for the red, green, and blue images. In particular, for each color and equivalent passband, the combined sensitivity of the sensor for that color and the frequency response of the equivalent passband may be used to find a spectral base function (along with the spectrum of the light source 106). The spectral base functions for the combinations of color and equivalent passband may then be used to obtain multispectral information from images obtained for some or all combinations of color and equivalent passband.

Figure 6:
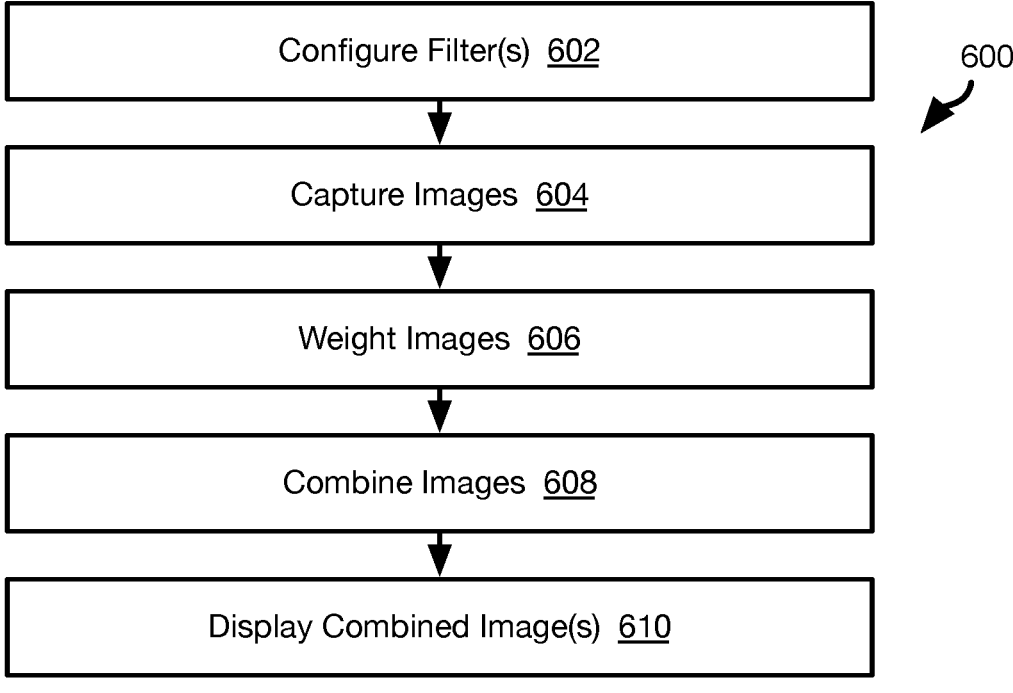
FIG. 6 is a process flow diagram of a method for performing light-efficient fluorescence imaging in accordance with certain embodiments.

Referring to FIG. 6, a method 600 may be executed by a computing system, e.g., computing system 700, that receives images from cameras 114, 116 of the system 100 or camera 302 of the system 300. Some embodiments described above use different filter configurations such as some or all of different optical filters 112, different orientations of optical filters 112 relative to camera 302 (operating as high-pass or low-pass filter), and/or omit the optical filter 112 in some configurations. In such embodiments, an electronic actuator may be used to automatically move or rotate optical filters 112 and/or move or rotate the camera 302 in order to achieve the different filter configurations. The computing system 700 may be coupled to the electronic actuators in order to achieve the different filter configurations when performing the method 600. The computing system 700 may be further coupled to the light source 106 and be configured to illuminate the retina 102 with the light source 106 when capturing images as described above.

The method 600 may include configuring, at step 602, an optical filter 112 of one or more available optical filters 112 and capturing, at step 604, one or more images of the retina 102 with the filter configuration from step 602 using the cameras 114, 116 or the camera 302. Step 604 includes emitting a flash from the light source 106 in order to invoke fluorescence of the retina 102. Steps 602 and 604 may be repeated with each iteration of step 602 achieving a different filter configuration, such as some or all of the filter configurations described above with respect to FIGS. 2A to 2C and FIGS. 4A and 4B.

The method 600 may include weighting, at step 606, the images obtained at one or more iterations of the step 604. In some embodiments, step 606 is omitted. Where step 606 is performed, the weights may be determined as described above.

The images, which may be weighted at step 606, may then be combined, at step 608, to obtain combined images, each combined image corresponding to light having wavelengths within an equivalent passband. For example, step 606 may include combining the images to obtain some or all of IP1, IP2, IP3, IP4, or images for more equivalent passbands using the approach described above.

The combined images from step 608 may then be displayed at step 610, such as on a display device of a computing system 700. Other processing may be performed such as feature identification using a machine learning model, processing the combined images and or identified features using a machine learning model to identify a disease represented in the combined images, or other processing. The combined images may be displayed subject to control of an interface through which a user may select an equivalent passband in order to invoke display of the image corresponding to the equivalent passband.

Figure 7:
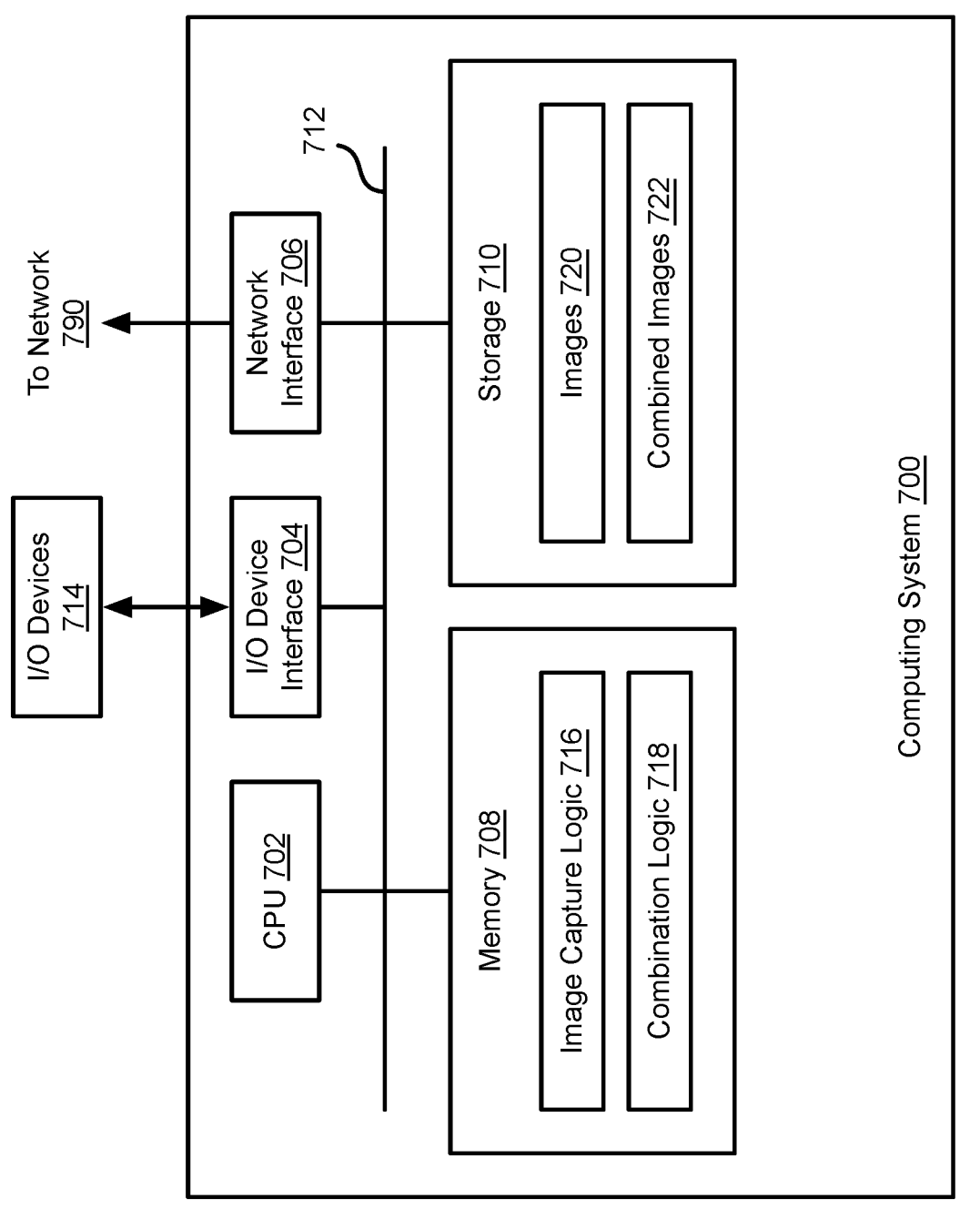
FIG. 7 illustrates an example computing device that implements, at least partly, one or more functionalities for implementing light-efficient fluorescence imaging in accordance with certain embodiments.

FIG. 7 illustrates an example computing system 700 that implements, at least partly, one or more functionalities described herein. The computing system 700 may be integrated with an imaging device capturing images according to one or more of the imaging modalities described herein or may be a separate computing device.

As shown, computing system 700 includes a central processing unit (CPU) 702, one or more I/O device interfaces 704, which may allow for the connection of various I/O devices 714 (e.g., keyboards, displays, mouse devices, pen input, etc.) to computing system 700, network interface 706 through which computing system 700 is connected to network 790, a memory 708, storage 710, and an interconnect 712.

CPU 702 may retrieve and execute programming instructions stored in the memory 708. Similarly, CPU 702 may retrieve and store application data residing in the memory 708. The interconnect 712 transmits programming instructions and application data, among CPU 702, I/O device interface 704, network interface 706, memory 708, and storage 710. CPU 702 is included to be representative of a single CPU, multiple CPUs, a single CPU having multiple processing cores, and the like.

Memory 708 is representative of a volatile memory, such as a random access memory, and/or a nonvolatile memory, such as nonvolatile random access memory, phase change random access memory, or the like. As shown, memory 708 may store executable code image capture logic 716, such as logic for performing steps 602 and 604 of the method 600. The memory 708 may store executable code implementing combination logic 718 for combining images to obtain passband images, such as described above with respect to FIG. 2D, FIGS. 4A and 4B, FIG. 5, and step 608 of FIG. 6.

Storage 710 may be non-volatile memory, such as a disk drive, solid state drive, or a collection of storage devices distributed across multiple storage systems. The storage 710 may store images 720 obtained using the system 100 or 300 and combined images 722 as described above with respect to FIG. 2D, FIGS. 4A and 4B, FIG. 5, and step 608 of FIG. 6.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system comprising:
one or more processing devices and one or more memory devices coupled to the one or more processing devices, the one or more memory devices storing executable code that, when executed by the one or more processing devices, causes the one or more processing devices to:
receive a first image of first light returned from a retina of a patient and filtered according to a first filtering, the first filtering excluding passband filtering;
receive a second image of second light returned from the retina of the patient and filtered according to a second filtering, the second filtering excluding the passband filtering;
combine the first image and the second image to obtain a combined image representing a portion of at least one of (i) the first light or (ii) the second light, within a passband, thereby creating an equivalent passband effect at the passband without using the passband filtering; and output a representation of the combined image to a display device.

2. The system of claim 1, wherein the executable code, when executed by the one or more processing devices, further causes the one or more processing devices to combine the first image and the second image by subtracting the first image from the second image.

3. The system of claim 2, wherein the first filtering is high pass filtering with a first cutoff wavelength and the second filtering is high pass filtering with a second cutoff wavelength that is lower than the first cutoff wavelength, the passband being between the first cutoff wavelength and the second cutoff wavelength.

4. The system of claim 2, wherein the first filtering is low pass filtering with a first cutoff wavelength and the second filtering is low pass filtering with a second cutoff wavelength that is higher than the first cutoff wavelength, the passband being between the first cutoff wavelength and the second cutoff wavelength.

5. The system of claim 1, further comprising:
a light source configured to illuminate the retina and coupled to the one or more processing devices;
a camera coupled to the one or more processing devices;
a first optical filter positionable between the camera and the retina; and
a second optical filter positionable between the camera and the retina;
wherein the executable code, when executed by the one or more processing devices, further causes the one or more processing devices to receive the first image when the first optical filter is positioned between the retina and the camera and receive the second image when the second optical filter is positioned between the retina and the camera.

6. The system of claim 1, further comprising:
a first camera coupled to the one or more processing devices;
a second camera coupled to the one or more processing devices; and
a first optical filter, the first optical filter being positionable with the first camera receiving light transmission from the first optical filter and the second camera receiving light reflection from the first optical filter;
wherein the executable code, when executed by the one or more processing devices, further causes the one or more processing devices to:
receive the first image from the first camera and a third image from the second camera with the first optical filter positioned between the first camera and the retina;
and
combine the first, second, and third images to obtain the combined image.

7. The system of claim 6, wherein:
the first and second optical filters are low-pass filters, the first optical filter having a higher cutoff wavelength than the second optical filter; and
the executable code, when executed by the one or more processing devices, further causes the one or more processing devices to combine the first, second, third, and fourth images to obtain the combined image by adding the first image and the fourth image and subtracting the second and third images.

8. The system of claim 6, wherein:
the first and second optical filters are high-pass filters, the first optical filter having a higher cutoff wavelength than the second optical filter; and the executable code, when executed by the one or more processing devices, further causes the one or more processing devices to combine the first, second, third, and fourth images to obtain the combined image by adding the third and second images and subtracting the first and fourth images.

9. The system of claim 6, wherein the first and second optical filters are dichroic mirrors.

10. A method comprising:

receiving, by a computing system, a first image of first light fluoresced by a retina of a patient and filtered according to a first filtering, the first filtering excluding passband filtering;

receiving, by the computing system, a second image of second light fluoresced by the retina of the patient and filtered according to a second filtering, the second filtering excluding the passband filtering;

combining, by the computing system, the first image and the second image to obtain a combined image representing a portion of at least one of: (i) the first light or (ii) the second light, within a passband, thereby creating an equivalent passband effect at the passband without using the passband filtering; and outputting, by the computing system, a representation of the combined image to a display device.

11. The method of claim 10, wherein combining the first image and the second image comprises subtracting the first image from the second image.

12. The method of claim 11, wherein the first filtering is high pass filtering with a first cutoff wavelength and the second filtering is high pass filtering with a second cutoff wavelength that is lower than the first cutoff wavelength, the passband being between the first cutoff wavelength and the second cutoff wavelength.

13. The method of claim 11, wherein the first filtering is low pass filtering with a first cutoff wavelength and the second filtering is low pass filtering with a second cutoff wavelength that is higher than the first cutoff wavelength, the passband being between the first cutoff wavelength and the second cutoff wavelength.

14. The method of claim 10, further comprising:

positioning a first optical filter between a camera and the retina;

flashing the retina with a light source and capturing the first image of light from the light source that is fluoresced by the retina and filtered by the first optical filter;

positioning a second optical filter between the camera and the retina; and flashing the retina with the light source and capturing the second image of light from the light source that is fluoresced by the retina and filtered by the second optical filter.

15. The method of claim 10, further comprising:

capturing the first image of light fluoresced by the retina and transmitted through a first optical filter to a first camera and capturing a third image of light fluoresced by the retina and reflected from the first optical filter to a second camera;

capturing the second image of light fluoresced by the retina and transmitted through a second optical filter to the first camera and capturing a fourth image of light fluoresced by the retina and reflected from the second optical filter to the second camera; and combining, by the computing system, the first, second, third, and fourth images to obtain the combined image.

16. The method of claim 15, wherein:

the first and second optical filters are low-pass filters, the first optical filter having a higher cutoff wavelength than the second optical filter; and combining the first, second, third, and fourth images to obtain the combined image comprises adding the first image and the fourth image and subtracting the second and third images.

17. The method of claim 15, wherein:

the first and second optical filters are high-pass filters, the first optical filter having a higher cutoff wavelength than the second optical filter; and combining the first, second, third, and fourth images to obtain the combined image comprises adding the third and second images and subtracting the first and fourth images.

18. The method of claim 15, wherein the first and second optical filters are dichroic mirrors.

19. A method comprising:

receiving, by a computing system, a first image of first light fluoresced by a retina of a patient and filtered by a notch filter;

receiving, by the computing system, a second image of second light fluoresced by the retina of the patient without filtering by the notch filter;

combining, by the computing system, the first image and the second image to obtain a combined image representing a portion of the second light within a passband corresponding to a rejection band of the notch filter, thereby creating an equivalent passband effect at the passband without using a passband filter; and outputting, by the computing system, a representation of the combined image to a display device.

20. The method of claim 19, wherein the notch filter is a dichroic mirror.

21. The system of claim 6, further comprising:

a light source configured to illuminate the retina and coupled to the one or more processing devices; and a second optical filter, the second optical filter being positionable with the first camera receiving light transmission from the second optical filter and the second camera receiving light reflection from the second optical filter;

wherein:

the executable code, when executed by the one or more processing devices, further causes the one or more processing devices to receive the second image from the first camera and a fourth image from the second camera with the second optical filter positioned between the first camera and the retina; and the combined image is obtained by combining the first, second, third, and fourth images.

* * * * *